(12) United States Patent
Singh et al.

(10) Patent No.: US 9,560,666 B1
(45) Date of Patent: Jan. 31, 2017

(54) METHOD AND SYSTEM FOR CARRIER FREQUENCY PRIORITIZATION BASED ON OPERATIONAL CHARACTERISTICS OF WIRELESS COMMUNICATION DEVICES

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Austin, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 204 days.

(21) Appl. No.: 14/315,542

(22) Filed: Jun. 26, 2014

(51) Int. Cl.
*H04W 72/10* (2009.01)

(52) U.S. Cl.
CPC .................. *H04W 72/10* (2013.01)

(58) Field of Classification Search
None
See application file for complete search history.

(56) References Cited

U.S. PATENT DOCUMENTS

| | | | | |
|---|---|---|---|---|
| 2010/0075689 A1* | 3/2010 | Uemura | ............ | H04W 52/0206 455/452.1 |
| 2012/0243871 A1* | 9/2012 | Huang | ................. | H04B 10/272 398/58 |
| 2012/0302229 A1* | 11/2012 | Ronneke | ........... | H04L 29/12754 455/422.1 |
| 2014/0141780 A1* | 5/2014 | Yang | ..................... | H04W 36/14 455/436 |
| 2014/0162661 A1* | 6/2014 | Shaw | .................... | H04W 36/22 455/439 |

OTHER PUBLICATIONS

U.S. Appl. No. 13/589,701, filed Aug. 20, 2012 etitled "Differential Service Control Through Dual-Indication of Network Performance", in the name of Raymond E. Reeves.
U.S. Appl. No. 12/881,538, filed Sep. 14, 2010 entitled "Method and System for Management of Neighbor Scanning", in the name of Sachin Vargantwar.

* cited by examiner

*Primary Examiner* — Christopher Crutchfield
*Assistant Examiner* — Tito Pham

(57) ABSTRACT

As disclosed, while a wireless communication device (WCD) is idling on a particular carrier frequency of a base station, the base station may receive a message broadcast by that base station, the message specifying multiple relative sets of priority levels defined for a set of carrier frequencies and correlating each of the multiple relative sets of priority levels with respective different WCD operational characteristics. In particular, the message may specify a first correlation of one relative set of priority levels with one WCD operational characteristic and includes a second correlation of a different relative set of priority levels with a different WCD operational characteristic. The WCD may select one of the relative sets of priority levels responsive to the WCD having a WCD operational characteristic that the message correlates with the selected relative set of priority levels. The WCD may then apply the selected relative set of priority levels.

16 Claims, 5 Drawing Sheets

METHOD AND SYSTEM FOR CARRIER FREQUENCY PRIORITIZATION BASED ON OPERATIONAL CHARACTERISTICS OF WIRELESS COMMUNICATION DEVICES

BACKGROUND

Unless otherwise indicated herein, the materials described in this section are not prior art to the claims and are not admitted to be prior art by inclusion in this section.

To provide cellular wireless communication service, a wireless service provider typically operates a radio access network (RAN) that includes a number of base stations that radiate to define wireless coverage areas, such as cells and cell sectors, in which wireless communication devices (WCDs) such as cell phones, tablet computers, tracking devices, embedded wireless modules, and other wirelessly-equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the RAN may engage in air interface communication with a base station and may thereby communicate via the base station with various remote network entities or with other WCDs served by the base station.

In general, a RAN may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of WCDs, initiation of communications, handoff between coverage areas, and functions related to air interface communication.

In accordance with the air interface protocol, each coverage area may operate on one or more carrier frequencies or blocks of frequencies (e.g., frequency bands, such as 698-960 MHz, 1610-2025 MHz, etc.) and may define a number of air interface channels for carrying information between the base station and WCDs. These channels may be defined in various ways, such as through frequency division multiplexing, time division multiplexing, and/or code-division multiplexing, for instance. By way of example, each coverage area may define a pilot channel, reference channel, or other resource on which the base station may broadcast a pilot signal, reference signal, or the like that WCDs may detect as an indication of coverage and may measure to evaluate coverage strength. As another example, each coverage area may define one or more uplink control channels or other resources on which WCDs may transmit control messages to the base station. And each coverage area may define one or more downlink control channels or other resources on which the base station may transmit control messages or other information to WCDs. Further, each coverage area may define one or more traffic channels or other resources for carrying bearer communication traffic such (e.g., user traffic or application level traffic) as voice data and other data between the base station and WCDs.

When a WCD first powers on or enters into a base station's coverage area, the WCD may register with the RAN in that coverage area by transmitting a registration request, such as an attach request, to the base station serving that coverage area. The attach request may cause the base station or associated infrastructure to authenticate and authorize the WCD for service by the base station and to reserve network resources for use to serve the WCD. In particular, the attach request may result in setup of one or more virtual bearer connections extending in the network between the base station and one or more transport networks and extending over the air interface as a radio link between the base station and the WCD. Each such bearer may have a particular service level and intended use. For instance, one such bearer may be a default data bearer for use to carry general data communications to and from the WCD. Whereas, another such bearer may be a signaling bearer for use to carry packet-based session setup signaling such as Session Initiation Protocol (SIP) signaling between the WCD and a network communication server, and another such bearer may be a dedicated bearer that provides a guaranteed minimum bit-rate for carrying real-time media communications for instance. Certain bearers may be established for the WCD at the time of the WCD initially attaching with the base station, while others, such as a guaranteed minimum bit-rate bearer, may be established for the WCD (i.e., "assigned" to the WCD) after the WCD has initially attached with the base station (e.g., when a WCD initiates a voice over LTE (VoLTE) call or other such real-time communication session, for instance).

Once the WCD is attached with a base station, the WCD may operate in a connected mode or an idle mode. In the connected mode, the WCD may engage in communication of bearer data (e.g., application layer communications, such as SIP signaling, voice communication, video communication, file transfer, gaming communication, or the like), transmitting bearer data on uplink traffic channel resources to the base station and receiving bearer on downlink traffic channel resources from the base station.

After a timeout period of no bearer data communication between the base station and the WCD (possibly with respect to a particular bearer), or for other reasons, the WCD may transition from the connected mode to the idle mode, with the base station releasing the radio link portion of one or more bearer connections assigned to the WCD, so as to conserve air interface resources while still having the one or more bearer connections assigned to the WCD. In the idle mode, the WCD may then simply monitor a downlink control channel to receive overhead information and to check for any page messages for the WCD. Further, while the WCD is operating in the idle mode, the WCD may continue to regularly scan pilot or reference signals on both the carrier frequency on which the WCD is idling and other carrier frequencies as well, to help ensure that the WCD continues to operate on carrier frequencies providing the strongest coverage.

OVERVIEW

In some scenarios, while in the idle mode, the WCD may receive from the base station a system information message specifying a priority level for the carrier frequency on which the WCD is currently idling, as well as respective priority levels for each of one or more other carrier frequencies used by the RAN. While the WCD is idling on a particular carrier frequency of the base station, the WCD may receive and read such a system information message to determine these priority levels. If the WCD then detects threshold stronger coverage on another carrier frequency that has a higher priority level than the WCD's current carrier frequency, the WCD may transition to idle on that other carrier frequency (i.e., engage in idle handover to the other carrier frequency), regardless of the coverage strength on the WCD's current carrier frequency on which the WCD is idling. Whereas, if the WCD detects threshold stronger coverage on another carrier frequency that has a lower priority level than the WCD's current carrier frequency, the WCD may transition to idle on that other carrier frequency only if WCD also detects threshold low coverage strength on the WCD's current carrier frequency. These specified priority levels can be used in other ways as well.

These priority levels specified for a set of carrier frequencies may be applied by all WCDs served by the base station. However, in some scenarios, it may be desirable to have different WCDs each apply different sets of priority levels for a given set of carrier frequencies. For instance, the WCDs may each have different operational characteristics, and each WCD may apply a different set of priority levels for the given set of carrier frequencies based on that WCD's particular operational characteristic.

To facilitate this in practice, the system information message broadcast by the base station may specify one set of carrier frequency priority levels for WCDs with one particular WCD operational characteristic and also specify another set of carrier frequency priority levels for WCDs with another WCD operational characteristic. Accordingly, a WCD with the one particular WCD operational characteristic may select and apply the one set of carrier frequency priority levels, whereas a different WCD with the other WCD operational characteristic may select and apply the other set of carrier frequency priority levels. These WCD operational characteristics may include a type of service that a WCD supports (e.g., VoLTE, a form factor of a WCD (e.g., smartphone, laptop computer, radio, etc.), or a type of bearer assigned to a WCD (e.g., default data bearer, Internet Multimedia Service (IMS) signaling bearer, etc.), among other possibilities.

Disclosed herein is a method and corresponding system to help with prioritization of carrier frequencies based on operational characteristics of WCDs. In accordance with the disclosed method, a base station may be provisioned to broadcast a system information message specifying multiple different sets of priority levels for a given set of carrier frequencies, where one set of priority levels may prioritize the given set of carrier frequencies differently than another set of priority levels. Further, the system information message may correlate each set of priority levels with a respective WCD operational characteristic, so as to enable a WCD with a given WCD operational characteristic to select a set of priority levels that is correlated with that given WCD operational characteristic. Accordingly, that WCD may receive the system information message while idling on a particular carrier frequency and select that set of priority levels in response to the WCD having that given WCD operational characteristic. The WCD may then apply that set of priority levels, perhaps by transitioning from idling on the particular carrier frequency to idling on a different carrier frequency with a higher priority level.

It should be noted that while the method is described herein with respect to carrier frequencies, in some scenarios the method may involve the message specifying different relative prioritizations for a set of carrier frequency bands rather than for a set of individual carrier frequencies.

In one respect, disclosed is a method that includes receiving, by a WCD that is idling on a particular carrier frequency of a base station, a message broadcast by the base station, the message specifying (i) a set of carrier frequencies, (ii) multiple different relative prioritizations of the carrier frequencies of the set, where one of the relative prioritizations defines relative priority levels among the carrier frequencies of the set and another of the relative prioritizations defines different relative priority levels among the carrier frequencies of the set, and (iii) respective correlations between the relative prioritizations and WCD operational characteristics, including a correlation of each relative prioritization with a respective WCD operational characteristic. The method also includes the WCD selecting, from the received message, one of the relative prioritizations based at least in part on the WCD having a particular WCD operational characteristic that the message correlates with the selected relative prioritization. The method then includes the WCD operating in accordance with the selected relative prioritization.

In another respect, disclosed is another method that includes receiving, by a WCD that is idling on a particular carrier frequency of a base station, a message broadcast by the base station, the message (i) specifying multiple relative sets of priority levels defined for a set of carrier frequencies and (ii) correlating each of the multiple relative sets of priority levels with respective different WCD operational characteristics, where the set of carrier frequencies includes at least one carrier frequency different from the particular carrier frequency on which the WCD is idling, and where the message specifies a first correlation of one of the relative sets of priority levels with one WCD operational characteristic and includes a second correlation of a different one of the relative sets of priority levels with a different WCD operational characteristic. The method also includes the WCD selecting, from the received message, one of the relative sets of priority levels responsive to the WCD having a particular WCD operational characteristic that the message correlates with the selected relative set of priority levels. The method then includes the WCD applying the selected relative set of priority levels.

In yet another respect, disclosed is a WCD that includes a wireless communication interface, at least one processor, data storage, and program instructions stored in the data storage and executable by the at least one processor to cause the WCD to perform functions. The functions may include receiving, via the wireless communication interface while the WCD is idling on a particular carrier frequency of a base station, a message broadcast by the base station, the message specifying (i) a set of carrier frequencies, (ii) multiple different relative prioritizations of the carrier frequencies of the set, where one of the relative prioritizations defines relative priority levels among the carrier frequencies of the set and another of the relative prioritizations defines different relative priority levels among the carrier frequencies of the set, and (iii) respective correlations between the relative prioritizations and WCD operational characteristics, including a correlation of each relative prioritization with a respective WCD operational characteristic. The functions may also include selecting, from the received message, one of the relative prioritizations based at least in part on the WCD having a particular WCD operational characteristic that the message correlates with the selected relative prioritization. The functions may further include operating in accordance with the selected relative prioritization.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
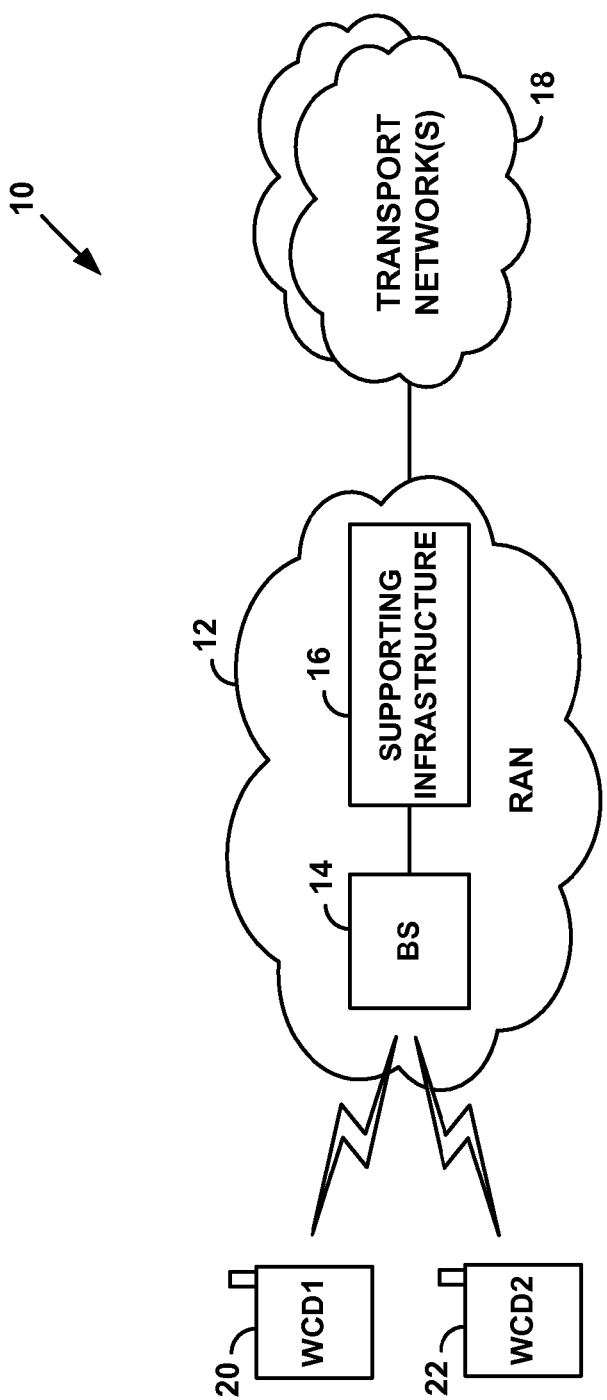
FIG. 1 is a simplified block diagram of an example communication system in which aspects of the present disclosure can be implemented.

The present method and system will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Referring to the drawings, as noted above, FIG. 1 is a simplified block diagram of an example communication system 10 in which the present method can be implemented. As shown, the example system 10 includes a radio access network (RAN) 12 operated by a wireless service provider. The RAN 12 may be any type of network operating in accordance with a particular air interface protocol, such as LTE, CDMA, or another type of air interface protocol noted above. The RAN 12 is shown to include a representative base station 14 (e.g., a base transceiver station (BTS), access node, node-B, eNodeB (eNB), or the like) that radiates to define a number of coverage areas, where each coverage area is operating on one or more carrier frequencies or frequency bands. Further, the RAN 12 then includes supporting infrastructure 16, such as a base station controller, radio network controller, mobility management entity, mobile switching center, and/or gateway, which may function to control aspects of base station operation and/or to provide connectivity with one or more transport networks 18 such as the PSTN and/or the Internet.

In practice, the wireless service provider of the RAN 12 may operate the RAN as a public land mobile network (PLMN) and provide service to WCDs subscribed to the PLMN. In addition, the wireless service provider may also provide service to WCDs subscribed to another PLMN that is operated by a different wireless service provider with which the wireless service provider has a roaming agreement (i.e., a roaming partner PLMN).

FIG. 1 further illustrates a first representative WCD 20 and a second representative WCD 22 that are located within coverage of the RAN 12 and being served by the base station 14 over respective air interfaces. In some arrangements, the first WCD 20 may be subscribed to the PLMN, whereas the second WCD 22 may be subscribed to the roaming partner PLMN, although other arrangements are possible as well. Further, the first and second WCDs 20, 22 may be any devices that are equipped to engage in wireless communication with the RAN 12 and to carry out various WCD functions described herein. By way of example, one or both of the WCDs may be a cell phone, or a wirelessly-equipped tablet, computer, tracking device, appliance, embedded wireless module, or other wirelessly-equipped device of a type now known or later developed, whether or not operated by a "user."

As discussed above, while being served by the base station 14, a WCD may have one or more assigned bearer connections, which may have been assigned upon the WCD registering with the RAN 12 and/or after the WCD registered with the RAN. By way of example, once the WCD attached with the base station 14, a VoLTE signaling bearer (e.g., an IMS signaling bearer for carrying VoLTE call setup signaling) may have been set up and assigned to the WCD, among other possible bearers. The WCD may then have operated in a connected mode, in which the WCD engaged in VoLTE communication of bearer data with the RAN 12 (e.g., VoLTE call data (voice data) communicated between the WCD and the RAN). In turn, the WCD may then have transitioned to an idle mode, in which the VoLTE signaling bearer remained assigned to the WCD. It should be understood that a WCD having a bearer assigned/established to the WCD does not require that the WCD is operating in a connected mode. As noted above, while the radio link portions of one or more bearers assigned to the WCD may be released, such bearers may remain assigned to the WCD.

As another example, once the WCD attached with the base station 14, a default data bearer may have been set up and assigned to the WCD. The WCD may then have operated in an idle mode, in which the default data bearer remained assigned to the WCD. Other example scenarios are possible as well, in which the WCD may have other bearers assigned to it in addition to or instead of those noted above.

In some scenarios, the base station 14 may broadcast a message that specifies a relative priority level respectively for each frequency in a set of carrier frequencies used by the RAN 12, including a carrier frequency on which a WCD may currently be idling. As noted above, while operating in the idle mode, the WCD may receive the message from the base station 14 and read the message to determine the priority levels defined for the given set of carrier frequencies. Based in part on the determined priority levels, the WCD may then choose to operate on another carrier frequency different from the carrier frequency on which the WCD is currently idling, such as another carrier frequency on which the base station 14 is operating or a carrier frequency on which a different base station is operating. By way of example, if another carrier frequency has a higher priority level than the carrier frequency on which the WCD is currently idling, and if the WCD detects threshold stronger coverage on the other carrier frequency, the WCD may choose to engage in idle handover to the other carrier frequency. Other examples are possible as well.

As noted above, the present disclosure provides a method and system to facilitate the application of different carrier frequency prioritizations based on WCD operational characteristics. In accordance with the disclosure, a message broadcast by a base station may specify different relative prioritizations of carrier frequencies of a given set, where each relative prioritization is correlated with a respective WCD operational characteristic and each relative prioritization is specified with respect to the entire given set of carrier frequencies. For instance, the message may specify one relative prioritization for WCDs with one WCD operational characteristic, where the one relative prioritization may define one set of priority levels for the carrier frequencies of the given set. Further, the message may also specify another relative prioritization for WCDs with another WCD operational characteristic, where the other relative prioritization may define another, different set of priority levels for the carrier frequencies of the given set. Thus, upon receiving and reading the message while idling on a particular carrier frequency of the base station, a WCD that has the one WCD operational characteristic may select and apply the one relative prioritization, whereas another WCD that has the other WCD operational characteristic may select and apply the other relative prioritization.

Once a WCD selects one of the relative prioritizations, the process of the WCD applying the selected relative prioritization may take various forms. For instance, after selecting one of the relative prioritizations, the WCD may read the selected relative prioritization to determine priority levels of each carrier frequency of the given set of carrier frequencies, including a priority level of the carrier frequency on which the WCD is currently idling and a priority level of at least one other carrier frequency of the given set. The WCD may then compare those priority levels as a basis to decide whether to engage in idle handover or some other process. As a more specific example, the WCD may read the selected relative prioritization to determine that the selected relative prioritization defines a higher priority level for another carrier frequency than for the carrier frequency on which the WCD is currently idling. The WCD may also detect that the other carrier frequency has a threshold high signal strength. In this example, the WCD may then decide to engage in idle handover to the other carrier frequency. Conversely, in scenarios where the selected relative prioritization defines a lower priority level for another carrier frequency than for the carrier frequency on which the WCD is currently idling, the WCD may still decide to engage in idle handover to the other carrier frequency, provided that the other carrier frequency has a threshold high signal strength and the carrier frequency on which the WCD is currently idling has a threshold low signal strength. Other example processes are possible as well.

TABLE 1

| Carrier Frequency | Priority Level for WCDs with Operational Characteristic X | Priority Level for WCDs with Operational Characteristic Y |
| --- | --- | --- |
| Carrier Frequency A | 3 | 1 |
| Carrier Frequency B | 1 | 4 |
| Carrier Frequency C | 2 | 2 |
| Carrier Frequency D | 4 | 3 |

Table 1 depicts an example of two different relative prioritizations that the message broadcast by the base station may specify. In this example, the message may specify two different relative prioritizations for a given set of carrier frequencies, the given set including carrier frequencies A through D. Further, the message may correlate one of the two relative prioritizations with WCDs that have WCD operational characteristic X, whereas the message may correlate the other of the relative prioritizations with WCDs that have WCD operational characteristic Y. Still further, the priority levels of each of the two relative prioritizations may be represented numerically as priority level 1 (highest priority level) through priority level 4 (lowest priority level), for instance. However, it should be understood that, in other examples, priority levels may be represented in a manner other than numerically. Also, in some scenarios, the message may specify different relative prioritizations for a given set of carrier frequency bands rather than for a given set of individual carrier frequencies, as noted above.

Moreover, the example depicted in Table 1 serves as an example of how an operator of the base station's RAN may promote the use of certain carrier frequencies by WCDs with certain WCD operational characteristics, in accordance with the operator's policy rules. For instance, the operator may promote the use of carrier frequency B by WCDs with WCD operational characteristic X, where the one relative prioritization defines a priority level of 1 for carrier frequency B. Whereas, the operator may promote the use of carrier frequency A by WCDs with WCD operational characteristic Y, where the other relative prioritization defines a priority level of 1 for carrier frequency A.

In line with the present disclosure, a WCD may have certain WCD operational characteristics, which could be static WCD operational characteristics or dynamic WCD operational characteristics. Static WCD operational characteristics of the WCD, for instance, may include WCD operational characteristics that may not typically change over time, such as a type of service supported by the WCD (e.g., VoLTE service, video-communication, and the like). Another static WCD operational characteristic may be a form factor of the WCD, such as a type of device (e.g., phone, tracking device, embedded wireless communication module, etc.), a configuration of input/output components (e.g., screen size, speaker configuration, touchscreen, etc.), a type of firmware, an operating system version, among other possibilities.

Dynamic WCD operational characteristics of the WCD, on the other hand, may include WCD operational characteristics that dynamically vary over time, such as what bearers are currently assigned to the WCD, with each bearer having a particular quality of service class identifier (QCI) (e.g., a default data bearer (QCI 9), IMS signaling bearer (QCI 5), dedicated VoLTE bearer (QCI 1), and the like). Other examples of dynamic WCD operational characteristics may include a type of communication the WCD was engaged in before transitioning from a connected mode to an idle mode (e.g., voice, web browsing, etc.), or a type of application that is currently running on the WCD (e.g., text messaging, web browsing, email, etc.), among other possibilities.

Other types of WCD operational characteristics are possible as well, such as a PLMN to which the WCD subscribes for service.

Furthermore, in practice, the WCD may store in memory a record of its WCD operational characteristics. By way of example, the WCD may store identifiers associated with the WCD's manufacturer, model number, operating version number, and/or other data that may specify or otherwise indicate aspects of the WCD's form factor, such as data indicative of certain specifications of the WCD (e.g., a type of camera, a type of user interface, etc.). Additionally or alternatively, the WCD may store a record of the PLMN to which the WCD is subscribed for service (e.g., a PLMNid), a record of one or more bearers that are currently assigned to the WCD, a record of the types of communication in which the WCD is engaged, and/or a record of the types of applications that are currently running on the WCD, among other possibilities.

The process described above may be implemented with respect to these and other types of WCD operational characteristics. In line with the discussion above, the base station 14 may first broadcast a message specifying different relative prioritizations of a given set of carrier frequencies, the given set including one or more carrier frequencies on which the first and second WCDs 20, 22 are idling. In particular, this message may specify the different relative prioritizations for different WCD operational characteristics, thus enabling WCDs to select and apply one of the specified relative prioritizations based on the WCDs having respective different WCD operational characteristics that are correlated with the different relative prioritizations.

As an example, the message broadcast by the base station 14 may specify the different relative prioritizations for different PLMNs, such as a first relative prioritization for WCDs that are subscribed to the PLMN of the base station's wireless service provider and a second relative prioritization for WCDs that are not subscribed to that PLMN. Thus, the first WCD 20 that is subscribed to the PLMN may receive and read the message to determine that the message correlates the first relative prioritization with the PLMN. The first WCD 20 may then determine that it is subscribed to the PLMN, perhaps by referring to a PLMNid of the PLMN that is stored in the first WCD's memory. Based on this determination, the first WCD 20 may select the first relative prioritization and then apply the first relative prioritization in some process, such as one of the processes described above. For instance, after selecting the first relative prioritization, the first WCD 20 may read the first relative prioritization to determine priority levels of each carrier frequency of the given set of carrier frequencies, including a priority level of the carrier frequency on which the first WCD 20 is currently idling and a priority level of at least one other carrier frequency of the given set. The first WCD 20 may then compare those priority levels as a basis to decide whether to engage in idle handover or some other process.

In contrast, the second WCD 22 may receive and read the message to determine that the message correlates the second relative prioritization with WCDs that are not subscribed to the PLMN. The second WCD 22 may then determine that it is not subscribed to the different PLMN, perhaps by determining that the second WCD does not have the PLMN's PLMNid stored in memory. Based on this determination, the second WCD 22 may select the second relative prioritization. The second WCD 22 may then apply the second relative prioritization in a manner similar to or different from the first WCD's application of the first relative prioritization. For instance, while the first WCD 20 may decide to engage in idle handover, the second WCD 22 may decide not to engage in idle handover and instead engage in another process based on the priority levels defined by the second relative prioritization.

As another example, the message may specify a first relative prioritization for WCDs that have a particular type of bearer currently established, such as an IMS signaling bearer (or other voice signaling bearer that can be used for voice communication), and may also specify a second relative prioritization for WCDs that do not have the particular type of bearer currently established, such as for WCDs that do not have the IMS signaling bearer currently established. In that scenario, the first WCD 20, which may have the IMS signaling bearer currently established, may read the message and select the first relative prioritization.

Whereas, the second WCD 22, which may not have the IMS signaling bearer currently established, may read the message and select the second relative prioritization. The first and second WCDs 20, 22 may then apply the first relative prioritization and the second relative prioritization, respectively, in line with the discussion above.

As yet another example, the message may specify a first relative prioritization for WCDs of a particular form factor, such as a smartphone, and may also specify a second relative prioritization for WCDs of another form factor, such as a laptop computer. In that scenario, the first WCD 20, which may be a smartphone, may read the message and select the first relative prioritization. Whereas, the second WCD 22, which may be a laptop computer, may read the message and select the second relative prioritization. The first and second WCDs 20, 22 may then apply the first relative prioritization and the second relative prioritization, respectively, in line with the discussion above.

Other examples are possible as well, including, but not limited to, variations of the examples described above. For instance, the first and second WCDs 20, 22 may have other types of WCD operational characteristics. Additionally or alternatively, one or more of the first and second WCDs 20, 22 may take other actions in response to selecting their respective prioritizations and determining the priority levels defined in those respective prioritizations.

Figure 2:
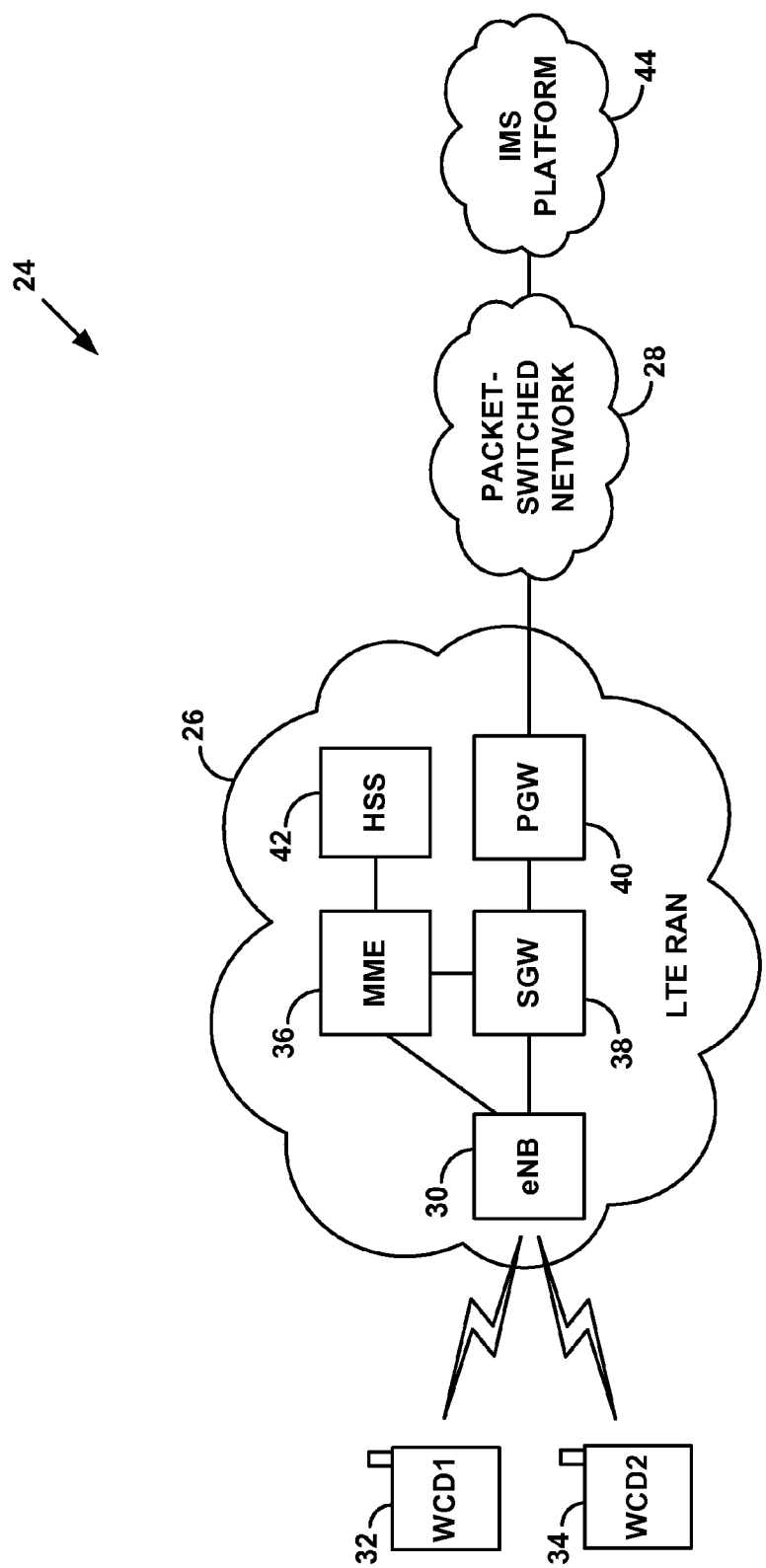
FIG. 2 is a simplified block diagram of a more specific communication system in which aspects of the disclosure can be implemented.

Next, FIG. 2 is a simplified block diagram of a more specific communication system 24 in which aspects of the disclosure can be implemented. In particular, the figure depicts an example RAN 26 as an LTE network that is arranged to serve WCDs and to provide connectivity with a packet-switched network 28.

As shown, the example LTE RAN 26 includes an eNB (base station) 30 that radiates to provide air interface through which to serve WCDs (e.g., cell phones, wirelessly-equipped computers, tracking devices, embedded wireless communication modules, or any other types of wireless communication devices), such as a first representative WCD 32 and a second representative WCD 34 that are served through respective air interfaces. Further, the LTE RAN 26 includes a mobility management entity (MME) 36 that has a communication interface with the eNB 30, and a serving gateway (SGW) 38 that has communication interfaces with the eNB and the MME. Still further, the LTE RAN 26 includes a packet data network gateway (PGW) 40 that has a communication interface with the SGW 38 and that provides connectivity with the packet-switched network 28. And yet still further, the LTE RAN 26 includes a home subscriber server (HSS) 42 that has a communication interface with the MME 36. The HSS 42 may store service profiles for WCDs and may function to facilitate authorization, authentication, and other such functions.

As further shown, the system 24 includes an Internet Multimedia Subsystem (IMS) platform 44 accessible via the packet-switched network 28, which functions to support voice over Internet Protocol (VoIP) call connections such as VoLTE calls and other such packet-based real-time media sessions.

In accordance with LTE, when a WCD enters into coverage of the eNB 30, the WCD and LTE RAN 26 may engage in an initial attach process through which the LTE RAN establishes for the WCD one or more bearers extending between the WCD and the PGW 40, for carrying data communications between the WCD and the packet-switched network 28. In typical practice, for instance, the LTE RAN 26 may establish for the WCD at least a default Internet bearer for carrying general "best efforts" data traffic (such web browsing traffic, file transfer traffic, and messaging traffic) between the WCD and various remote network entities. Further, if the WCD subscribes to VoLTE service, the network may also establish for the WCD an IMS signaling bearer for carrying VoLTE call setup signaling such as SIP signaling between the WCD and the IMS platform 44.

This initial setup of one or more bearers for the WCD involves establishing for each bearer a respective virtual tunnel that includes a radio link tunnel extending between the WCD and the eNB 30 and a backhaul tunnel extending between the eNB and the PGW 40 via the SGW 38. Further, the setup may involve the WCD entering into a Radio Resource Control (RRC) "connected" mode in which the WCD interacts with the eNB 30 for transmission of bearer data between the WCD and the eNB. Alternatively, the WCD may operate in an RRC "idle" mode, in which the one or more radio link portions may be released, yet the WCD may still have one or more bearers assigned to the WCD.

The process described above may be implemented with respect to the system 24 shown in FIG. 2. In line with the discussion above, the eNB 30 may broadcast a message specifying different relative prioritizations of a given set of carrier frequencies, the given set including carrier frequencies on which the first and second WCDs 32, 34 are idling (i.e., operating in RRC "idle" mode) as well as other carrier frequencies used by the LTE RAN 26. Namely, the eNB 30 may broadcast this information in the form of a System Information Block #5 (SIB5) message or other type of message that specifies the different relative prioritizations. The message may specify the different relative prioritizations for different WCD operational characteristics, thus enabling WCDs served by the LTE RAN 26 to select and apply one of the specified relative prioritizations based on the WCDs having respective different WCD operational characteristics that are correlated with the different relative prioritizations.

For example, the message broadcast by the eNB 30 may specify a first relative prioritization for WCDs that have an IMS signaling bearer currently established, and may also specify a second relative prioritization for WCDs that do not have an IMS signaling bearer currently established. In this example, the first WCD 32 may support VoLTE service and may thus have an IMS signaling bearer currently established, whereas the second WCD 34 may not support VoLTE service and thus may have only a default Internet bearer currently established. Accordingly, the first WCD 32 may receive and read the message, and thereby determine that the message correlates the first relative prioritization with WCDs that have the IMS signaling bearer currently established. The first WCD 32 may then determine that it has the IMS signaling bearer currently established, perhaps by referring to a bearer identifier and QCI identifier (e.g., QCI 5) for the IMS signaling bearer stored in the first WCD's memory, as noted above. The first WCD 32 may then select and apply the first relative prioritization in some manner. For instance, the first WCD 32 may read the first relative prioritization to determine priority levels of each carrier frequency of the given set of carrier frequencies, including a priority level of the carrier frequency on which the first WCD 32 is currently idling and a priority level of at least one other carrier frequency of the given set. The first WCD 32 may then determine, based on a comparison of those priority levels, that another carrier frequency of the given set has a higher priority level. The first WCD 32 may thus decide to engage in idle handover from the carrier frequency on which it is currently idling to the other carrier frequency.

In contrast, the second WCD 34 may receive and read the message, and thereby determine that the message correlates the second relative prioritization with WCDs that do not have the IMS signaling bearer currently established. The second WCD 34 may then determine that it does not have the IMS signaling bearer currently established, perhaps by determining that the second WCD does not have a bearer identifier and QCI identifier for the IMS signaling bearer stored in the second WCD's memory. The second WCD 34 may then select and apply the second relative prioritization. Based at least in part on the priority levels that the second relative prioritization defines for the given set of carrier frequencies, the second WCD 34 may come to a decision similar to or different from the decision that the first WCD 32 made. For instance, the first WCD 32 may decide to engage in idle handover to another carrier frequency, whereas the second WCD 34 may decide to not engage in idle handover to another carrier frequency.

Other examples are possible as well, including, but not limited to, variations of the examples described above. Further, such examples may exist with respect to the LTE RAN 26 described above, other LTE RANs, and/or other types of networks not described herein, such as CDMA networks.

Figure 3:
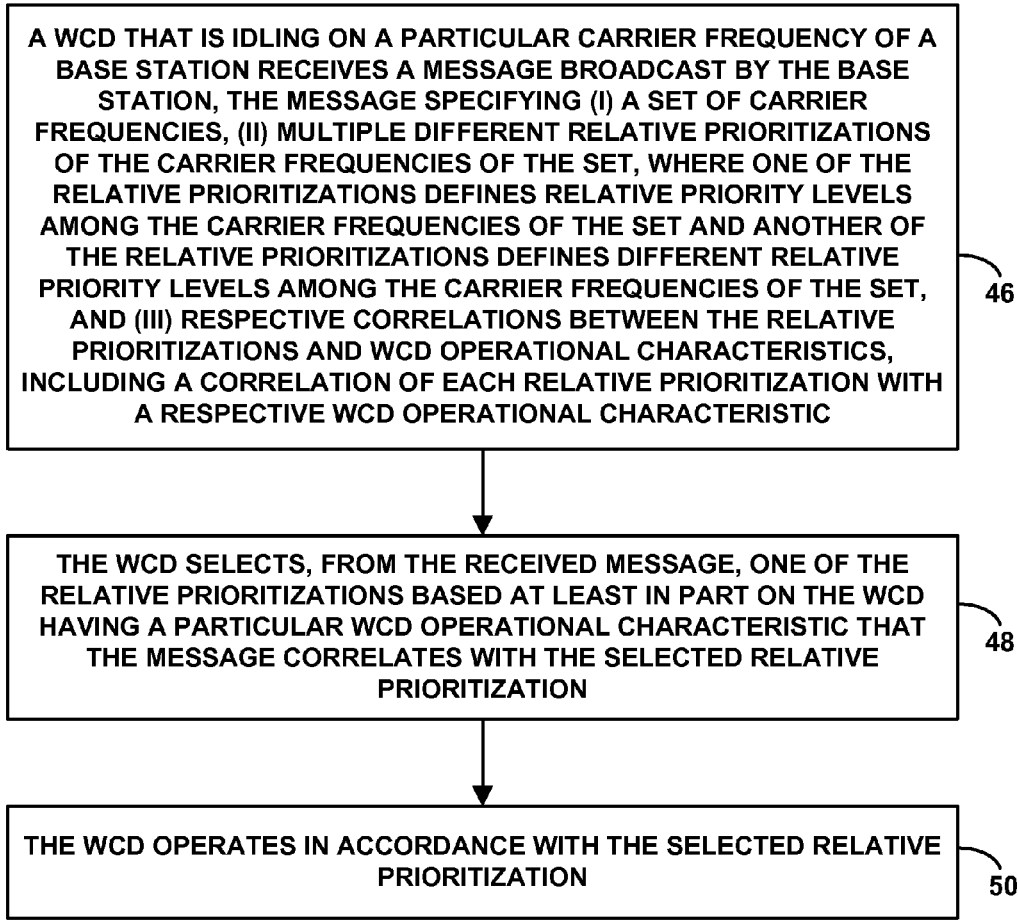
FIG. 3 is a flow chart depicting functions that can be carried out in accordance with the present method.

FIG. 3 is a flow chart depicting functions that can be carried out in accordance with an example of the present method. This example assumes that the present method is carried out by a WCD with respect to the example communication systems illustrated in FIGS. 1 and 2. It should be understood, however, that in other examples, the present method may also be carried out with respect to other network arrangements. The present method may include one or more operations, functions, or actions as illustrated by one or more of blocks 46-50.

At block 46, the method involves the WCD, while idling on a particular carrier frequency of a base station, receiving a message broadcast by the base station, the message specifying (i) a set of carrier frequencies, (ii) multiple different relative prioritizations of the carrier frequencies of the set, where one of the relative prioritizations defines relative priority levels among the carrier frequencies of the set and another of the relative prioritizations defines different relative priority levels among the carrier frequencies of the set, and (iii) respective correlations between the relative prioritizations and WCD operational characteristics, including a correlation of each relative prioritization with a respective WCD operational characteristic. Next, at block 48, the method involves the WCD selecting, from the received message, one of the relative prioritizations based at least in part on the WCD having a particular WCD operational characteristic that the message correlates with the selected relative prioritization. At block 50, the method then involves the WCD operating in accordance with the selected relative prioritization.

In an example implementation of this method, the message may specify a first relative prioritization correlated with a first WCD operational characteristic and may also specify a second relative prioritization correlated with a second WCD operational characteristic. In this scenario, there may be a first WCD that has the first WCD operational characteristic and a second WCD that has the second WCD operational characteristic, where both the first and second WCDs are idling on respective carrier frequencies of the base station. Thus, the first WCD may select and apply the first relative prioritization based at least in part on the first WCD having the first WCD operational characteristic that the message correlates with the first relative prioritization, whereas the second WCD may select and apply the second relative prioritization based at least in part on the second WCD having the second WCD operational characteristic that the message correlates with the second relative prioritization.

Furthermore, in some scenarios, there may be other WCDs served by the same base station, each with different WCD operational characteristics. In these scenarios, the message may specify additional relative prioritizations and may correlate other respective WCD operational characteristics with the additional relative prioritizations.

Figure 4:
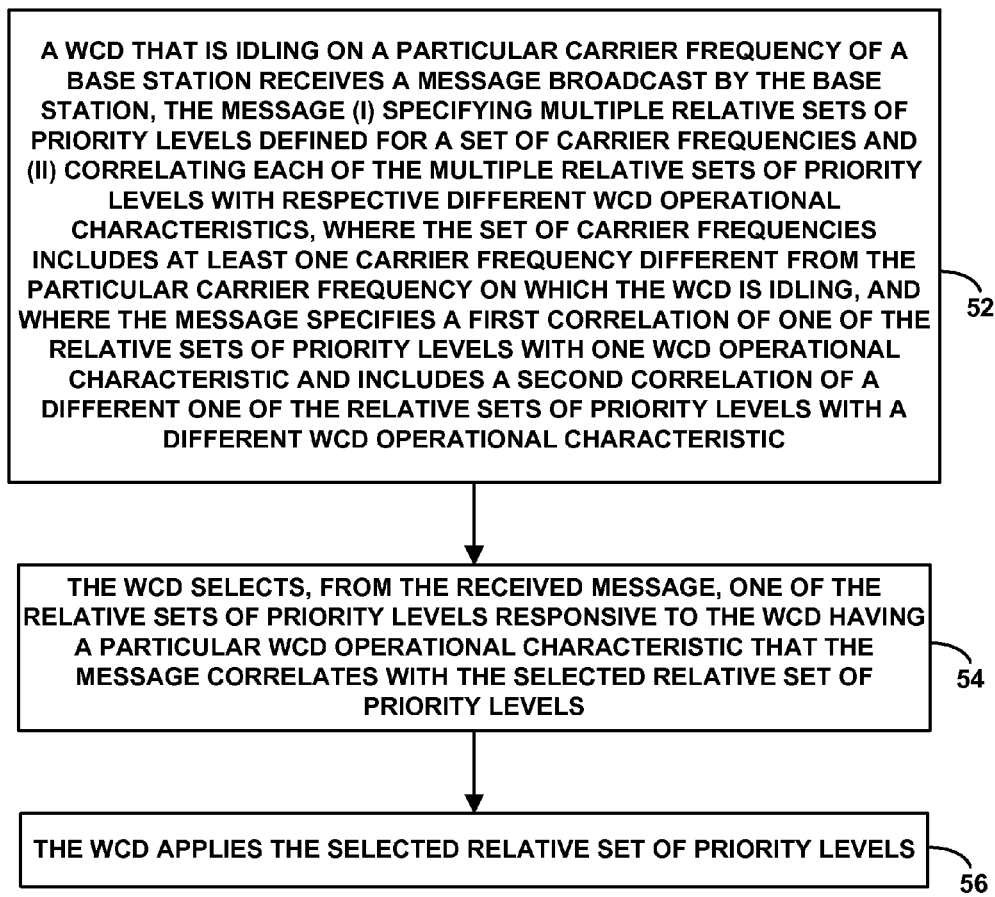
FIG. 4 is another flow chart depicting functions that can be carried out in accordance with the present method.

FIG. 4 is next another flow chart depicting functions that can be carried out in accordance with the present method. At block 52, the method involves the WCD, while idling on a particular carrier frequency of a base station, receiving a message broadcast by the base station, the message (i) specifying multiple relative sets of priority levels defined for a set of carrier frequencies and (ii) correlating each of the multiple relative sets of priority levels with respective different WCD operational characteristics, where the set of carrier frequencies includes at least one carrier frequency different from the particular carrier frequency on which the WCD is idling, and where the message specifies a first correlation of one of the relative sets of priority levels with one WCD operational characteristic and includes a second correlation of a different one of the relative sets of priority levels with a different WCD operational characteristic. Next, at block 54, the method involves the WCD selecting, from the received message, one of the relative sets of priority levels responsive to the WCD having a particular WCD operational characteristic that the message correlates with the selected relative set of priority levels. At block 56, the method then involves the WCD applying the selected relative set of priority levels.

In an example implementation of this method, the message may specify a first relative set of priority levels correlated with a first WCD operational characteristic and may also specify a second relative set of priority levels correlated with a second WCD operational characteristic. Thus, as discussed above, a first WCD with the first WCD operational characteristic may select and apply the first relative prioritization, whereas a second WCD with the second WCD operational characteristic may select and apply the second relative prioritization.

Figure 5:
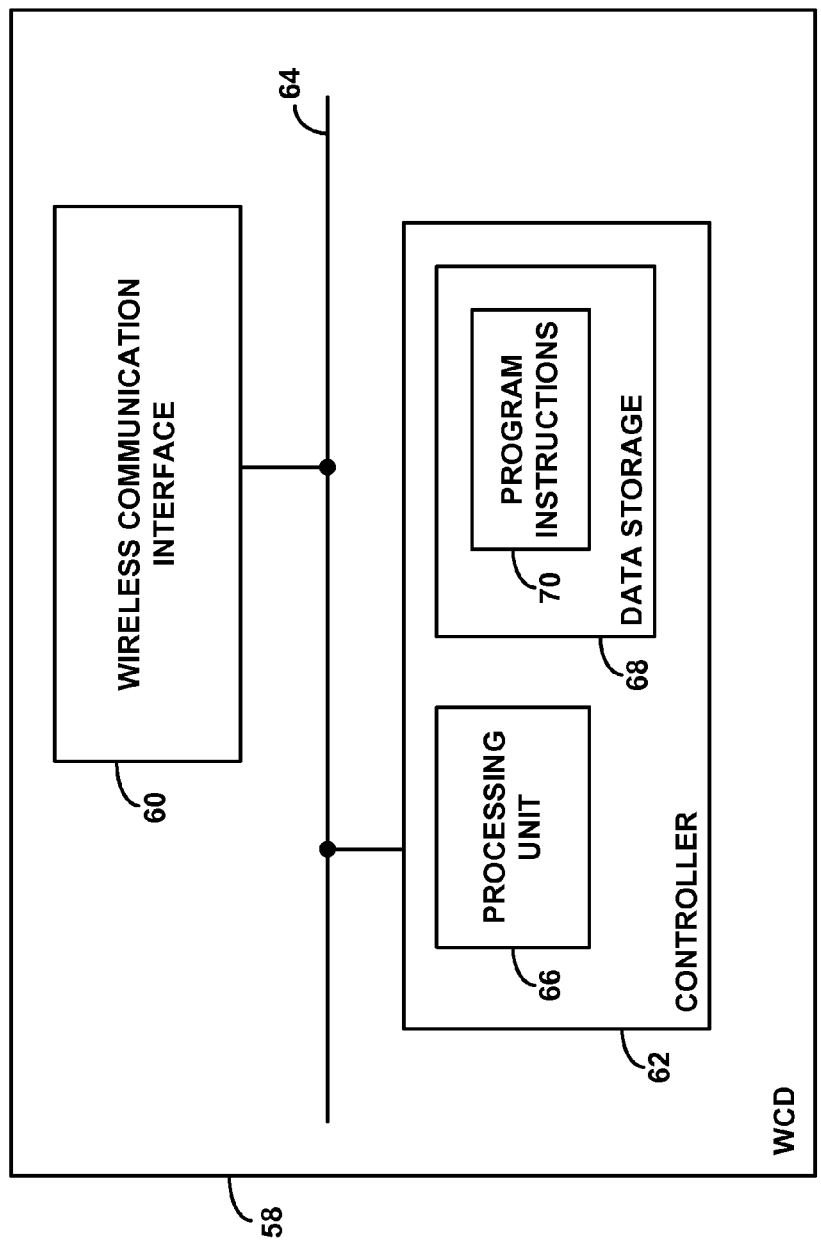
FIG. 5 is a simplified block diagram of a representative WCD arranged to implement aspects of the present method.

Finally, FIG. 5 is a simplified block diagram of a WCD 58 arranged to implement the present method. As shown in FIG. 5, the WCD includes a wireless communication interface 60 and a controller 62, both of which may be communicatively linked together by a system bus network, or other connection mechanism 64.

The wireless communication interface 60 may include an antenna structure and associated components (e.g., a mobile station modem chipset) for engaging in wireless communication with a RAN that radiates to define a plurality of wireless coverage areas each operating on one or more carrier frequencies or frequency bands. As such, the wireless communication interface 60 may support communication on various carrier frequencies and may comprise an integrated circuit that is arranged with logic compliant with an applicable air interface protocol such as one of those noted above for instance. The WCD 58 may also include a multi-mode radio arranged to support service according to various air interface protocols.

The wireless communication interface 60, as well as the controller 62, may be configured to carry out various functions described herein. For instance, the wireless communication interface 60 may be configured to receive the message broadcast by the base station. The controller 62 may then be configured to read the message, determine the relative prioritizations specified by the message, select a particular relative prioritization, and then apply the selected relative prioritization.

As such, the controller 62 may be integrated with the wireless communication interface 60. For instance, program logic on a wireless communication interface chipset may be arranged to carry out the functions of the controller 62. In that or other arrangements, the controller 62 may comprise a processing unit 66 programmed with instructions to carry out aspects of the described method. For instance, the controller 62 may comprise one or more general-purpose processors (e.g., microprocessors) and/or one or more special-purpose processors (e.g., application specific integrated circuits), non-transitory data storage 68, and program instructions 70 stored in or encoded on the data storage and executable by the processor(s) to carry out various described functions.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, by a wireless communication device (WCD) that is idling on a particular carrier frequency of a base station, a message broadcast by the base station, the message specifying (i) a set of carrier frequencies, (ii) multiple different relative prioritizations of the carrier frequencies of the set, wherein one of the relative prioritizations defines relative priority levels among the carrier frequencies of the set and another of the relative prioritizations defines different relative priority levels among the carrier frequencies of the set, and (iii) respective correlations of the relative prioritizations with bearer quality of service class identifier (QCI) levels, including a correlation of each relative prioritization with a respective bearer QCI level;
the WCD selecting, from the received message, one of the relative prioritizations based at least in part on the WCD currently having assigned to the WCD a bearer with a particular bearer QCI level that the message correlates with the selected relative prioritization; and
the WCD operating in accordance with the selected relative prioritization.

2. The method of claim 1, wherein the set of carrier frequencies includes at least one carrier frequency different from the particular carrier frequency on which the WCD is idling.

3. The method of claim 1, wherein the set of carrier frequencies includes a set of frequency bands, and
wherein one of the relative prioritizations defines relative priority levels among the carrier frequency bands of the set and another of the relative prioritizations defines different relative priority levels among the carrier frequency bands of the set.

4. The method of claim 1, wherein the WCD selecting one of the relative prioritizations based at least in part on the WCD currently having assigned to the WCD a bearer with a particular bearer QCI level that the message correlates with the selected relative prioritization comprises:

in response to the WCD receiving the message, the WCD reading the message to determine that the message specifies a correlation of a particular relative prioritization with a particular bearer QCI level of a bearer, wherein the bearer is currently assigned to the WCD; and based on the specified correlation, the WCD selecting that particular relative prioritization.

5. The method of claim 1, wherein the set of carrier frequencies includes the particular carrier frequency on which the WCD is idling.

6. The method of claim 1, wherein the WCD is a first WCD served by the base station, the particular bearer QCI level is a first bearer QCI level, and the selected relative prioritization is a first relative prioritization, the method further comprising:

a second WCD served by the base station receiving the message, wherein the second WCD currently has assigned to the second WCD a bearer with a second bearer QCI level that the message correlates with a second relative prioritization;

the second WCD selecting, from the received message, the second relative prioritization based at least in part on the second WCD currently having assigned to the second WCD a bearer with the second bearer QCI level that the message correlates with the second relative prioritization; and the second WCD operating in accordance with the second relative prioritization.

7. The method of claim 1, wherein the message correlates the selected relative prioritization with a bearer QCI level of a voice signaling bearer, wherein the WCD selecting one of the relative prioritizations based at least in part on the WCD currently having assigned to the WCD a bearer with a particular bearer QCI level that the message correlates with the selected relative prioritization comprises the WCD selecting the one of the relative prioritizations based at least in part on the WCD currently having assigned to the WCD a bearer with the bearer QCI level of a voice signaling bearer.

8. The method of claim 1, wherein the message correlates the selected relative prioritization with a bearer QCI level of a default data bearer, and wherein the WCD selecting one of the relative prioritizations based at least in part on the WCD currently having assigned to the WCD a bearer with a particular bearer QCI level that the message correlates with the selected relative prioritization comprises the WCD selecting the one of the relative prioritizations based at least in part on the WCD currently having assigned to the WCD a bearer with the bearer QCI level of a default data bearer.

9. A method comprising:

receiving, by a wireless communication device (WCD) that is idling on a particular carrier frequency of a base station, a message broadcast by the base station, the message (i) specifying multiple relative sets of priority levels defined for a set of carrier frequencies and (ii) correlating each of the multiple relative sets of priority levels with respective different bearer quality of service class identifier (QCI) levels, wherein the set of carrier frequencies includes at least one carrier frequency different from the particular carrier frequency on which the WCD is idling, and wherein the message specifies a first correlation of one of the relative sets of priority levels with one bearer QCI level and includes a second correlation of a different one of the relative sets of priority levels with a different bearer QCI level;

the WCD selecting, from the received message, one of the relative sets of priority levels responsive to the WCD currently having assigned to the WCD a bearer with a particular bearer QCI level that the message correlates with the selected relative set of priority levels; and the WCD applying the selected relative set of priority levels.

10. The method of claim 9, wherein the WCD selects the one of the relative sets of priority levels responsive to the WCD (i) reading the message to determine that the message correlates the one of the relative sets of priority levels with the particular bearer QCI level and (ii) determining that the WCD currently has assigned to the WCD a bearer with the particular bearer QCI level.

11. The method of claim 10, wherein the WCD is idling on the particular carrier frequency of the base station in accordance with a Long Term Evolution (LTE) air interface protocol, wherein the particular bearer QCI level is a particular bearer QCI level of a Voice over LTE (VoLTE) signaling bearer, and wherein the WCD currently has assigned to the WCD the VoLTE signaling bearer.

12. A wireless communication device (WCD) comprising:
a wireless communication interface;
at least one processor;
data storage; and
program instructions stored in the data storage and executable by the at least one processor to cause the WCD to perform functions comprising:

while the WCD is idling on a particular carrier frequency of a base station, receiving, via the wireless communication interface, a message broadcast by the base station, the message specifying (i) a set of carrier frequencies, (ii) multiple different relative prioritizations of the carrier frequencies of the set, wherein one of the relative prioritizations defines relative priority levels among the carrier frequencies of the set and another of the relative prioritizations defines different relative priority levels among the carrier frequencies of the set, and (iii) respective correlations of the relative prioritizations with bearer quality of service class identifier (QCI) levels, including a correlation of each relative prioritization with a respective bearer QCI level, selecting, from the received message, one of the relative prioritizations based at least in part on the WCD currently having assigned to the WCD a bearer with a particular bearer QCI level that the message correlates with the selected relative prioritization, and operating in accordance with the selected relative prioritization.

13. The WCD of claim 12, wherein the message is a System Information Block #5 (SIB5) message.

14. The WCD of claim 12, wherein the WCD is idling on the particular carrier frequency of the base station in accordance with an air interface protocol selected from the group consisting of: a Long Term Evolution (LTE) air interface protocol and a Code Division Multiple Access (CDMA) air interface protocol.

15. The WCD of claim 12, wherein the functions further comprise:

engaging in idle handover from the particular carrier frequency on which the WCD is idling to a different carrier frequency that is a member of the set of carrier frequencies, wherein engaging in idle handover is performed in response to (i) the selected relative prioritization defining a higher priority level for the different carrier frequency than for the particular carrier frequency and (ii) the WCD determining that the different carrier frequency has a threshold high signal strength.

16. The WCD of claim 12, wherein the functions further comprise:

engaging in idle handover from the particular carrier frequency on which the WCD is idling to a different carrier frequency that is a member of the set of carrier frequencies, wherein engaging in idle handover is performed in response to (i) the selected relative prioritization defining a lower priority level for the different carrier frequency than for the particular carrier frequency, (ii) the WCD determining that the different carrier frequency has a threshold high signal strength, and (iii) the WCD determining that the particular carrier frequency has a threshold low signal strength.

* * * * *